United States Patent
Cha et al.

(10) Patent No.: US 10,328,410 B2
(45) Date of Patent: Jun. 25, 2019

(54) SYSTEMS AND METHODS FOR PRODUCING ELECTRICAL DISCHARGES IN COMPOSITIONS

(71) Applicant: KING ABDULLAH UNIVERSITY OF SCIENCE AND TECHNOLOGY, Thuwal (SA)

(72) Inventors: Min Suk Cha, Thuwal (SA); Xuming Zhang, Thuwal (SA); Suk Ho Chung, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 81 days.

(21) Appl. No.: 15/118,244

(22) PCT Filed: Feb. 17, 2015

(86) PCT No.: PCT/IB2015/000915
§ 371 (c)(1),
(2) Date: Aug. 11, 2016

(87) PCT Pub. No.: WO2015/128738
PCT Pub. Date: Sep. 3, 2015

(65) Prior Publication Data
US 2017/0165629 A1    Jun. 15, 2017

Related U.S. Application Data

(60) Provisional application No. 61/941,108, filed on Feb. 18, 2014.

(51) Int. Cl.
*B01J 19/08* (2006.01)
*H05H 1/48* (2006.01)

(52) U.S. Cl.
CPC .............. *B01J 19/088* (2013.01); *H05H 1/48* (2013.01); *B01J 2219/0807* (2013.01); *B01J 2219/0883* (2013.01); *B01J 2219/0884* (2013.01)

(58) Field of Classification Search
None
See application file for complete search history.

(56) References Cited

U.S. PATENT DOCUMENTS

2003/0201167 A1    10/2003    Gleeson et al.
2005/0189278 A1*    9/2005    Iijima ................... B01J 19/088
                                                                  210/192
(Continued)

FOREIGN PATENT DOCUMENTS

CN    1654343 A    8/2005
CN    1842491 A    10/2006
(Continued)

OTHER PUBLICATIONS

International Search Report and Written Opinion of Application No. PCT/IB2015/000915 dated Nov. 12, 2015, 12 pages.

*Primary Examiner* — Kishor Mayekar
(74) *Attorney, Agent, or Firm* — Billion & Armitage; Benjamin C. Armitage

(57) ABSTRACT

Systems and methods configured to produce electrical discharges in compositions, such as those, for example, configured to produce electrical discharges in compositions that comprise mixtures of materials, such as a mixture of a material having a high dielectric constant and a material having a low dielectric constant (e.g., a composition of a liquid having a high dielectric constant and a liquid having a low dielectric constant, a composition of a solid having a high dielectric constant and a liquid having a low dielectric constant, and similar compositions), and further systems and methods configured to produce materials, such as through (Continued)

material modification and/or material synthesis, in part, resulting from producing electrical discharges in compositions.

19 Claims, 2 Drawing Sheets

(56) References Cited

U.S. PATENT DOCUMENTS

2006/0198965 A1* 9/2006 Tudhope ............. C23C 16/0245
427/569
2013/0082034 A1 4/2013 Foret

FOREIGN PATENT DOCUMENTS

| CN | 101133183 A | 2/2008 |
| CN | 101146927 A | 3/2008 |
| CN | 103274501 A | 9/2013 |
| WO | 2004024316 A1 | 3/2004 |

* cited by examiner

SYSTEMS AND METHODS FOR PRODUCING ELECTRICAL DISCHARGES IN COMPOSITIONS

CROSS-REFERENCE TO RELATED APPLICATIONS

This application is the National Stage of International Application No. PCT/IB2015/000915, filed 17 Feb. 2015, which claims the benefit of and priority to U.S. Provisional Application No. 61/941,108, filed on 18 Feb. 2014, having the title "SYSTEMS AND METHODS FOR PRODUCING ELECTRICAL DISCHARGES IN COMPOSITIONS", the contents of all of which are incorporated by reference as if fully set forth herein.

BACKGROUND

1. Field of the Invention

The present invention relates generally to systems and methods configured to produce electrical discharges in compositions, and more particularly, but not by way of limitation, to systems and methods configured to produce electrical discharges in compositions that comprise mixtures of materials, such as a mixture of a material having a high dielectric constant and a material having a low dielectric constant (e.g., a composition of a liquid having a high dielectric constant and a liquid having a low dielectric constant, a composition of a solid having a high dielectric constant and a liquid having a low dielectric constant, and similar compositions). The present invention further relates to systems and methods configured to produce materials, such as by material modification and/or material synthesis, resulting, in part, from producing electrical discharges in compositions.

2. Description of Related Art

Examples of systems and methods for producing electrical discharges are disclosed, for example, in *Electrical Discharges in Polar Organic Liquids*, Plasma Processes and Polymers, Volume 6, Issue 11, pages 741-750 (Nov. 14, 2009) by Selma M. Thagard, Kazunori Takashima, and Akira Mizuno.

SUMMARY

This disclosure includes embodiments of systems and methods configured to produce electrical discharges in compositions (e.g., a composition of a liquid having a high dielectric constant and a liquid having a low dielectric constant, a composition of a solid having a high dielectric constant and a liquid having a low dielectric constant, and similar compositions), for example, to produce materials, such as by material modification (e.g., liquid fuel reforming) and/or material synthesis (e.g., gas fuel production).

Some embodiments of the present systems (e.g., a system for producing a voltage difference) comprise a container; an electrode configured to be at least partially disposed in the container and configured to be coupled to a power supply; and a gas supply system configured to be at least partially disposed in the container and configured to be coupled to a power supply, the gas supply system comprising a first gas pipe comprising a first end having an opening; and a second end configured to be coupled to a gas source; and a bore extending through the second end and the first end; where, if the first gas pipe is coupled to a gas source and the gas supply system is at least partially disposed in the container, gas from the gas source can be passed through the bore of the first gas pipe and into the container; a second gas pipe comprising a first end having an opening; and a second end configured to be coupled to a gas source; and a bore extending through the second end and the first end; and where, if the second gas pipe is coupled to a gas source and the gas supply system is at least partially disposed in the container, gas from the gas source can be passed through the bore of the second gas pipe and into the container; and where the system is configured, if activated, to produce a voltage difference between at least a portion of the gas supply system and the electrode. In some embodiments, the second gas pipe can be positioned such that the first pipe is disposed at least partially within the bore of the second gas pipe such that a channel is formed between the first gas pipe and the second gas pipe. In some embodiments, the electrode is at least partially disposed in the container and coupled to a power supply, the first gas pipe is coupled to a gas source and is at least partially disposed in the container, and the second gas pipe is coupled to a gas source and is at least partially disposed in the container, and where the second gas pipe is positioned such that the first pipe is disposed at least partially within the bore of the second gas pipe such that a channel is formed between the first gas pipe and the second gas pipe. In some embodiments, the container is configured to accommodate a composition comprising a liquid having a low dielectric constant and a liquid having a high dielectric constant. In some embodiments, the liquid having a low dielectric constant is an organic liquid, and the liquid having a high dielectric constant is an organic liquid. In some embodiments, a composition is disposed in the container between the gas supply system and the electrode, and the composition comprises a liquid having a low dielectric constant and a liquid having a high dielectric constant. In some embodiments, the liquid having a low dielectric constant is an organic liquid, and the liquid having a high dielectric constant is an organic liquid. In some embodiments, the liquid having a high dielectric constant has a dielectric constant of greater than 10. In some embodiments, the liquid having a low dielectric constant has a dielectric constant of less than or equal to 10. In some embodiments, the container is configured to accommodate a composition comprising a liquid having a low dielectric constant and a solid having a high dielectric constant. In some embodiments, the liquid having a low dielectric constant is an organic liquid, and the solid having a high dielectric constant is a packed solid. In some embodiments, a composition is disposed in the container between the gas supply system and the electrode, and the composition comprises a solid having a high dielectric constant and a liquid having a low dielectric constant. In some embodiments, the liquid having a low dielectric constant is an organic liquid, and the solid having a high dielectric constant is a packed solid. In some embodiments, the solid has a dielectric constant of greater than 10. In some embodiments, the liquid has a dielectric constant of less than or equal to 10. In some embodiments, the system further comprises a gas supply source coupled to the first gas pipe and the second gas pipe. In some embodiments, the gas supply source comprises a noble gas. In some embodiments, the gas supply source comprises at least one of hydrogen, carbon dioxide, helium, argon, oxygen, hydrocarbon gas, and nitrogen. In some embodiments, the first end of the first gas pipe is substantially pointed. In some embodiments, the first end of the first gas pipe is configured such that, if the system is activated, a nonuniform electrical field is produced between the gas supply system and the electrode. In some embodiments, the first end of the first gas pipe is substantially pointed. In some embodiments, the first end of the first gas pipe is configured such that, if the system is activated, a nonuniform electrical field is produced between the gas supply system and the electrode. In some embodiments, the first end of the first gas pipe is substantially pointed. In some embodiments, the liquid having a low dielectric constant and the liquid having a high dielectric constant are mixed by mechanical agitation. In some embodiments, the liquid having a low dielectric constant and the liquid having a high dielectric constant are mixed by at least one supersonic wave. In some embodiments, the liquid having a low dielectric constant and the liquid having a high dielectric constant are mixed by magnetic agitation. In some embodiments, the solid is at least one of substantially cylindrical, substantially rectangular, and substantially spherical. In some embodiments, the liquid having a low dielectric constant comprises at least one of alkane hydrocarbons, aromatic hydrocarbons, and alkene hydrocarbons. In some embodiments, the liquid having a low dielectric constant comprises at least one of alkane hydrocarbons, aromatic hydrocarbons, and alkene hydrocarbons. In some embodiments, the power supply is a high voltage power supply. In some embodiments, the power supply supplies from 0 to 200 kilovolts of power to the system. In some embodiments, the power supply is at least one of a pulsed power supply, an alternating current (AC) power supply, and a direct current (DC) power supply. In some embodiments, the container is electrically insulated. In some embodiments, the electrode comprises a plate-like configuration. In some embodiments, the electrode comprises a rod-like configuration. In some embodiments, the electrode comprises a needle-like configuration.

Some embodiments of the present systems (e.g., systems for producing an electrical discharge through a composition) comprise a power supply; a reactor comprising a container; an electrode at least partially disposed in the container and coupled to the power supply; and a gas supply system at least partially disposed in the container and coupled to the power supply; and a composition disposed in the container between the gas supply system and the electrode, where the composition comprises a liquid having a low dielectric constant and at least one of a liquid having a high dielectric constant and a solid having a high dielectric constant; where the system is configured, if activated, to produce a voltage difference between at least a portion of the gas supply system and the electrode. In some embodiments, the liquid having a low dielectric constant is an organic liquid. In some embodiments, the liquid having a high dielectric constant is an organic liquid. In some embodiments, the solid having a high dielectric constant is a packed solid. In some embodiments, the liquid having a high dielectric constant has a dielectric constant of greater than 10. In some embodiments, the liquid having a low dielectric constant has a dielectric constant of less than or equal to 10. In some embodiments, the solid has a dielectric constant of greater than 10. In some embodiments, the composition is mixed by mechanical agitation. In some embodiments, the composition is mixed by magnetic agitation. In some embodiments, the composition is mixed by at least one supersonic wave. In some embodiments, the solid is at least one of substantially cylindrical, substantially rectangular, and substantially spherical. In some embodiments, the liquid having a low dielectric constant comprises at least one of alkane hydrocarbons, aromatic hydrocarbons, and alkene hydrocarbons. Some embodiments of the present systems comprise a gas supply source coupled to the gas supply system. In some embodiments, the gas supply source comprises a noble gas. In some embodiments, the gas supply source comprises at least one of hydrogen, carbon dioxide, helium, argon, oxygen, hydrocarbon gas, and nitrogen. In some embodiments, at least a portion of the gas supply system is configured such that, if the system is activated, a nonuniform electrical field is produced between the gas supply system and the electrode. In some embodiments, at least a portion of the gas supply system is substantially pointed. In some embodiments, the gas supply system comprises a first gas pipe comprising a first end having an opening; and a second end configured to be coupled to a gas source; and a bore extending through the second end and the first end; where gas from a gas source can be passed through the bore of the first gas pipe and into the container; a second gas pipe comprising a first end having an opening; and a second end configured to be coupled to a gas source; and a bore extending through the second end and the first end; and where gas from a gas source can be passed through the bore of the second gas pipe and into the container. In some embodiments, the second gas pipe can be positioned such that the first pipe is disposed at least partially within the bore of the second gas pipe such that a channel is formed between the first gas pipe and the second gas pipe. In some embodiments, the first end of the first gas pipe is configured such that, if the system is activated, a nonuniform electrical field is produced between the gas supply system and the electrode. In some embodiments, the first end of the first gas pipe is substantially pointed. In some embodiments, the first end of the first gas pipe is configured such that, if the system is activated, a nonuniform electrical field is produced between the gas supply system and the electrode. In some embodiments, the first end of the first gas pipe is substantially pointed. In some embodiments, the power supply is a high voltage power supply. In some embodiments, the power supply supplies from 0 to 200 kilovolts of power to the system. In some embodiments, the power supply is at least one of a pulsed power supply, an alternating current (AC) power supply, and a direct current (DC) power supply. In some embodiments, the container is electrically insulated. In some embodiments, the electrode comprises a plate-like configuration. In some embodiments, the electrode comprises a rod-like configuration. In some embodiments, the electrode comprises a needle-like configuration.

Some embodiments of the present methods (e.g., methods for producing an electrical discharge through a composition) comprise disposing a composition, which comprises a liquid having a low dielectric constant and at least one of a liquid having a high dielectric constant and a solid having a high dielectric constant, in a reactor, where the reactor comprises a container; an electrode at least partially disposed in the container; and a gas supply system at least partially disposed in the container; and activating the reactor such that a voltage difference is produced between the gas supply system and the electrode. In some embodiments, the liquid having a low dielectric constant is an organic liquid. In some embodiments, the liquid having a high dielectric constant is an organic liquid. In some embodiments, the solid having a high dielectric constant is a packed solid. In some embodiments, the methods further comprise mixing the composition by mechanically agitating the composition. In some embodiments, the methods further comprise mixing the composition by producing at least one supersonic wave to pass through the composition. In some embodiments, the methods further comprise introducing gas from a gas source into the gas supply system such that the gas can enter the container. In some embodiments, the gas source comprises a noble gas. In some embodiments, the gas source comprises hydrogen. In some embodiments, the gas comprises carbon dioxide. In some embodiments, the gas comprises nitrogen.

In some embodiments, the gas comprises helium. In some embodiments, the gas comprises argon. In some embodiments, the gas comprises oxygen. In some embodiments, the gas comprises hydrocarbon gas. In some embodiments, the gas supply system comprises a first gas pipe comprising a first end having an opening; a second end configured to be coupled to a gas source; and a bore extending through the second end and the first end; where gas from a gas source can be passed through the bore of the first gas pipe and into the container; a second gas pipe comprising a first end having an opening; a second end configured to be coupled to a gas source; and a bore extending through the second end and the first end; where gas from a gas source can be passed through the bore of the second gas pipe and into the container. In some embodiments, the methods further comprise introducing gas from a gas source into the first gas pipe and the second gas pipe. In some embodiments, the gas source comprises a noble gas. In some embodiments, the gas source comprises hydrogen. In some embodiments, the gas comprises carbon dioxide. In some embodiments, the gas comprises nitrogen. In some embodiments, the gas comprises helium. In some embodiments, the gas comprises argon. In some embodiments, the gas comprises oxygen. In some embodiments, the gas comprises hydrocarbon gas. In some embodiments, the second gas pipe can be positioned such that the first pipe is disposed at least partially within the bore of the second gas pipe such that a channel is formed between the first gas pipe and the second gas pipe. In some embodiments, the methods further comprise introducing gas from a gas source into the first gas pipe and the second gas pipe such that gas is introduced into the container in at least three different locations. In some embodiments, the liquid having a high dielectric constant has a dielectric constant of greater than 10. In some embodiments, the liquid having a low dielectric constant has a dielectric constant of less than or equal to 10. In some embodiments, the solid has a dielectric constant of greater than 10. In some embodiments, the composition is mixed by mechanical agitation. In some embodiments, the composition is mixed by magnetic agitation. In some embodiments, the composition is mixed by at least one supersonic wave. In some embodiments, the solid is at least one of substantially cylindrical, substantially rectangular, and substantially spherical. In some embodiments, the liquid having a low dielectric constant comprises at least one of alkane hydrocarbons, aromatic hydrocarbons, and alkene hydrocarbons. In some embodiments, the liquid having a low dielectric constant comprises heptane and the liquid having a high dielectric constant comprises water, and the methods further comprise activating the reactor such that a voltage difference of 10 kilovolts or less is produced between the gas supply system and the electrode to produce an electrical discharge in the composition. In some embodiments, the liquid having a low dielectric constant comprises heptane and the liquid having a high dielectric constant comprises water, and the methods further comprise introducing oxygen from the gas supply system into the reactor; and activating the reactor such that at least one of $H_2$, CO, $CH_4$, heptanol, and heptanone is produced.

The term "coupled" is defined as connected, although not necessarily directly, and not necessarily mechanically. Two items are "couplable" if they can be coupled to each other. Unless the context explicitly requires otherwise, items that are couplable are also decouplable, and vice-versa. One non-limiting way in which a first structure is couplable to a second structure is for the first structure to be configured to be coupled (or configured to be couplable) to the second structure. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," and "about" may be substituted with "within [a percentage] of" what is specified, where the percentage includes 0.1, 1, 5, and 10 percent.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, or a component of a system that "comprises," "has," "includes" or "contains" one or more elements or features possesses those one or more elements or features, but is not limited to possessing only those elements or features. Likewise, a method that "comprises," "has," "includes" or "contains" one or more steps possesses those one or more steps, but is not limited to possessing only those one or more steps. Additionally, terms such as "first" and "second" are used only to differentiate structures or features, and not to limit the different structures or features to a particular order.

Any embodiment of any of the present systems and methods can consist of or consist essentially of—rather than comprise/include/contain/have—any of the described elements and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

Details associated with the embodiments described above and others are presented below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. At least some of the figures depict graphical symbols or representations that will be understood by those of ordinary skill in the art.

DESCRIPTION OF ILLUSTRATIVE EMBODIMENTS

Figure 1:
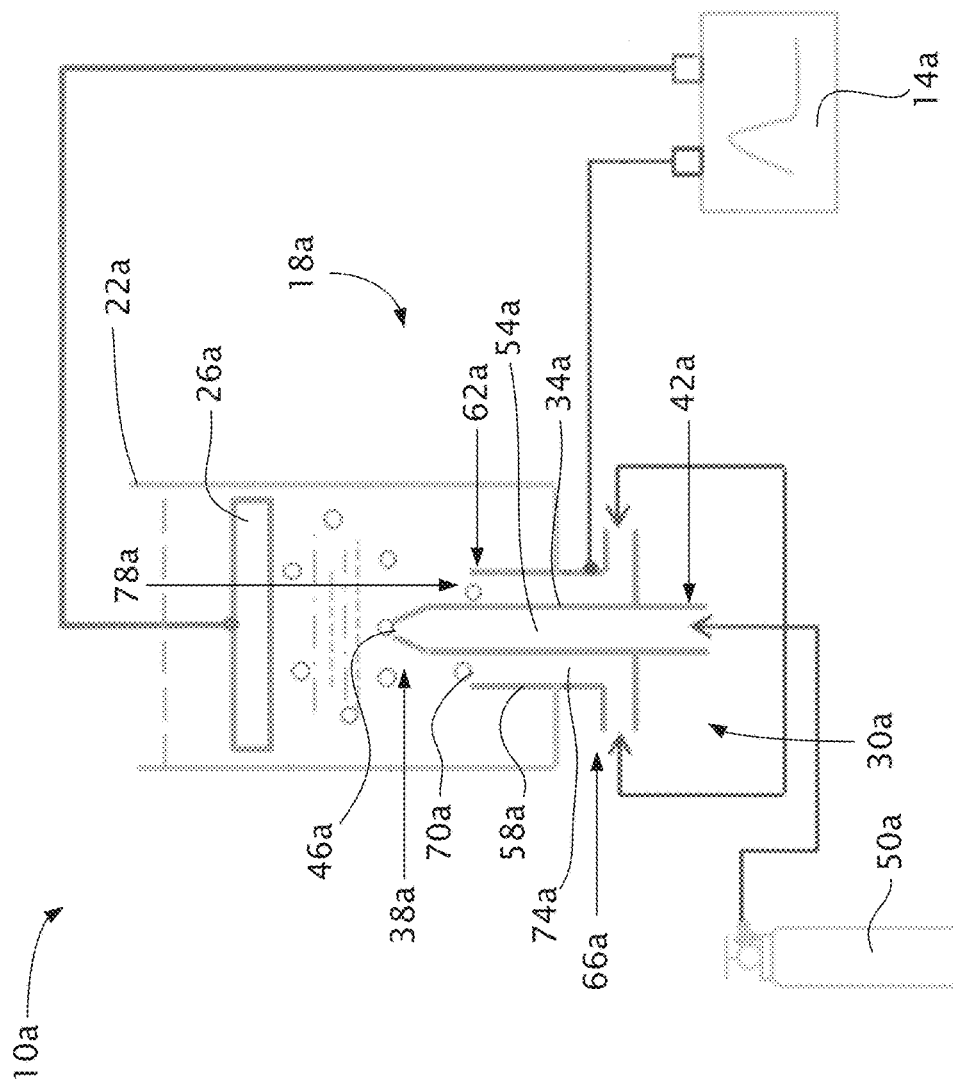
FIG. 1 depicts an embodiment of the present systems that are configured to produce electrical discharges in compositions, where the compositions comprise a liquid having a low dielectric constant and a liquid having a high dielectric constant.

Referring now to the drawings, and more particularly to FIG. 1, shown therein as numeral 10a is one embodiment of the present systems. In the embodiment shown, system 10a comprises power supply 14a (e.g., a high voltage power supply), which can be configured to provide, for example, from 0 to 200 kilovolts of power to system 10a. Though depicted as one symbol in FIG. 1, power supply 14a can comprise one or more power sources. Further, power supply 14a can be one or more of an alternating current (AC) power supply, a direct current (DC) power supply, and/or a pulsed power supply.

In the embodiment shown in FIG. 1, system 10a further comprises reactor 18a. Reactor 18a comprises container 22a, which is electrically insulated, electrode 26a, which is configured to be at least partially disposed in container 22a and configured to be coupled to power supply 14a (and is at least partially disposed in container 22a and coupled to power supply 14a in the embodiment shown), and gas supply system 30a, which is configured to be at least partially disposed in container 22a and configured to be coupled to power supply 14a (and is at least partially disposed in container 22a and coupled to power supply 14a in the embodiment shown). Though depicted as one symbol in FIG. 1, electrode 26a can comprise one or more electrodes having the same sizes and shapes or different sizes and shapes. For example, in the embodiment shown, electrode 26a comprises a plate-like configuration; however, in other embodiments, electrode 26a can comprise any suitable configuration, such as a needle-like configuration, a rod-like configuration, and the like. Further, electrode 26a may comprise, for example, copper alloys, graphite, any metal having a high melting point (e.g., steel, stainless steel, tungsten, platinum), and/or other suitable materials.

In the embodiment shown in FIG. 1, system 10a (and, more specifically, gas supply system 30a) comprises gas pipe 34a, which can be at least partially disposed in container 22a (and is at least partially disposed in container 22a in the embodiment shown). Gas pipe 34a includes first end 38a and second end 42a. First end 38a of gas pipe 34a has opening 46a through which fluid (e.g., gas) can exit gas pipe 34a. Second end 42a of gas pipe 34a is configured to be coupled to gas source 50a (and is coupled to gas source 50a in the embodiment shown). Gas source 50a may comprise one or more containers of gas. Further, if gas source 50a comprises one container of gas, gas source 50a may comprise one or more types of gas in the container. Similarly, if gas source 50a comprises more than one containers of gas, the more than one containers of gas may have the same or different types of gas, and each of the containers can have one or more types of gas in the container. Gas pipe 34a also includes bore 54a extending through second end 42a and first end 38a of gas pipe 34a. If gas pipe 34a is coupled to gas source 50a and is at least partially disposed in container 22a, as depicted in the embodiment shown, gas from gas source 50a may be passed through bore 54a of gas pipe 34a and into container 22a. Gas from gas source 50a may comprise, for example, hydrogen, carbon dioxide, helium, argon, nitrogen, oxygen, hydrocarbon gas, and/or any suitable noble gas or mixtures thereof. In the embodiment shown, first end 38a of gas pipe 34a is substantially pointed (e.g., at least a portion of the width of gas pipe 34a narrows from second end 42a to first end 38a). However, in other embodiments, first end 38a of gas pipe 34a may comprise any suitable shape such that, if system 10a is activated, a nonuniform electrical field is produced between gas supply system 30a and electrode 26a.

In the embodiment shown in FIG. 1, system 10a (and, more specifically, gas supply system 30a) comprises gas pipe 58a, which can be at least partially disposed in container 22a (and is at least partially disposed in container 22a in the embodiment shown). Gas pipe 58a includes first end 62a and second end 66a. First end 62a of gas pipe 58a has opening 70a through which fluid (e.g., gas) can exit gas pipe 58a. Second end 66a of gas pipe 58a is configured to be coupled to gas source 50a (and is coupled to gas source 50a in the embodiment shown). As above, gas source 50a may comprise one or more containers of gas. Further, if gas source 50a comprises one container of gas, gas source 50a can comprise one or more types of gas in the container. Similarly, if gas source 50a comprises more than one containers of gas, the more than one containers of gas may have the same or different types of gas, and each of the containers may have one or more types of gas in the container. Gas pipe 58a also includes bore 74a extending through second end 66a and first end 62a of gas pipe 58a. If gas pipe 58a is coupled to gas source 50a and is at least partially disposed in container 22a, as depicted in the embodiment shown, gas from gas source 50a may be passed through bore 74a of gas pipe 58a and into container 22a. Gas pipe 34a and gas pipe 58a can be coupled to the same or different containers of gas (e.g., such that the same or different types of gas can pass through gas pipe 34a and gas pipe 58a). As above, gas from gas source 50a may comprise, for example, hydrogen, carbon dioxide, helium, argon, nitrogen, oxygen, hydrocarbon gas, and/or any suitable noble gas. In some embodiments, such as the embodiment shown, gas pipe 58a may be positioned such that gas pipe 34a is disposed at least partially within bore 74a of gas pipe 58a such that channel 78a is formed between gas pipe 34a and gas pipe 58a. In the embodiment shown, gas pipe 34a and gas pipe 58a share a longitudinal axis (e.g., gas pipe 34a is concentric with gas pipe 58a). However, in other embodiments, gas pipe 34a and gas pipe 58a may have different substantially longitudinal axes (e.g., such that channel 78a between gas pipe 34a and gas pipe 58a does not have a uniform width).

In the embodiment shown in FIG. 1, container 22a may be configured to accommodate (and is depicted as accommodating) a composition that comprises a liquid (e.g., an organic or inorganic liquid) having a low dielectric constant (e.g., alkane hydrocarbons, aromatic hydrocarbons, and alkene hydrocarbons, and the like) and a liquid (e.g., an organic or inorganic liquid) having a high dielectric constant (e.g., water). Mixing a liquid having a high dielectric constant with a liquid having a low dielectric constant raises the effective dielectric constant of the composition above the dielectric constant of the liquid having a low dielectric constant. Varying the dielectric constant of the liquid having a high dielectric constant and/or the liquid having a low dielectric constant varies the effective dielectric constant of the composition, and such a variance can affect the voltage difference that is necessary to achieve electrical discharge in the composition. In the embodiment shown, the composition is disposed in container 22a, at least some of which is between gas supply system 30a and electrode 26a. In the embodiment shown, the liquid having a high dielectric constant has a dielectric constant of greater than 10 (e.g., 10.001, 11, 12, 13, 14, 15, or more). For example, some liquids having a high dielectric constant include water (approximate dielectric constant of 80.4), acetone (approximate dielectric constant of 20.7), alcohol, ethyl (ethanol) (approximate dielectric constant of 24.3), alcohol, methyl (methanol) (approximate dielectric constant of 33.1), alcohol, propyl (approximate dielectric constant of 21.8), cresol (approximate dielectric constant of 10.6), ethylene glycol (approximate dielectric constant of 37), and the like. In the embodiment shown, the liquid having a low dielectric constant has a dielectric constant of less than or equal to 10 (e.g., 10, 9, 8, 7, 6, or less). For example, some liquids having a low dielectric constant include acetic acid (approximate dielectric constant of 6.2), naphthalene (approximate dielectric constant of 2.5), benzene (approximate dielectric constant of 2.3), butane (approximate dielectric constant of 1.4), caproic acid (approximate dielectric constant of 2.6), castor oil (approximate dielectric constant of 4.7), cotton seed oil (approximate dielectric constant of 3.1), decane (approximate dielectric constant of 2.0), dodecane (approximate dielectric constant of 2.0), gasoline (approximate dielectric constant of 2.0), heptane (approximate dielectric constant of 1.9), hexane (approximate dielectric constant of 2.0), jet fuel (approximate dielectric constant of 1.7), octane (approximate dielectric constant of 2.0), toluene (approximate dielectric constant of 2.4), olive oil (approximate dielectric constant of 3.1), and the like. The liquid having a low dielectric constant and the liquid having a high dielectric constant can be mixed, for example, by mechanical agitation, magnetic agitation, one or more acoustic waves (e.g., supersonic waves), and/or any other suitable mixing device.

In the embodiment shown, system $10a$ is configured such that, if activated, system $10a$ produces a voltage difference in reactor $18a$ and between at least a portion of gas supply system $30a$ and electrode $26a$. Such a voltage difference in reactor $18a$ may cause electrical discharge in the composition. The present systems and methods permit electrical discharge in a composition to be achieved at lower voltage differences. For example, electrical discharge can be achieved in heptane with a voltage difference of approximately 20 kilovolts. By contrast, with the present systems and methods, electrical discharge can be achieved in a composition comprising heptane and water with a voltage difference of approximately 8 kilovolts.

Figure 2:
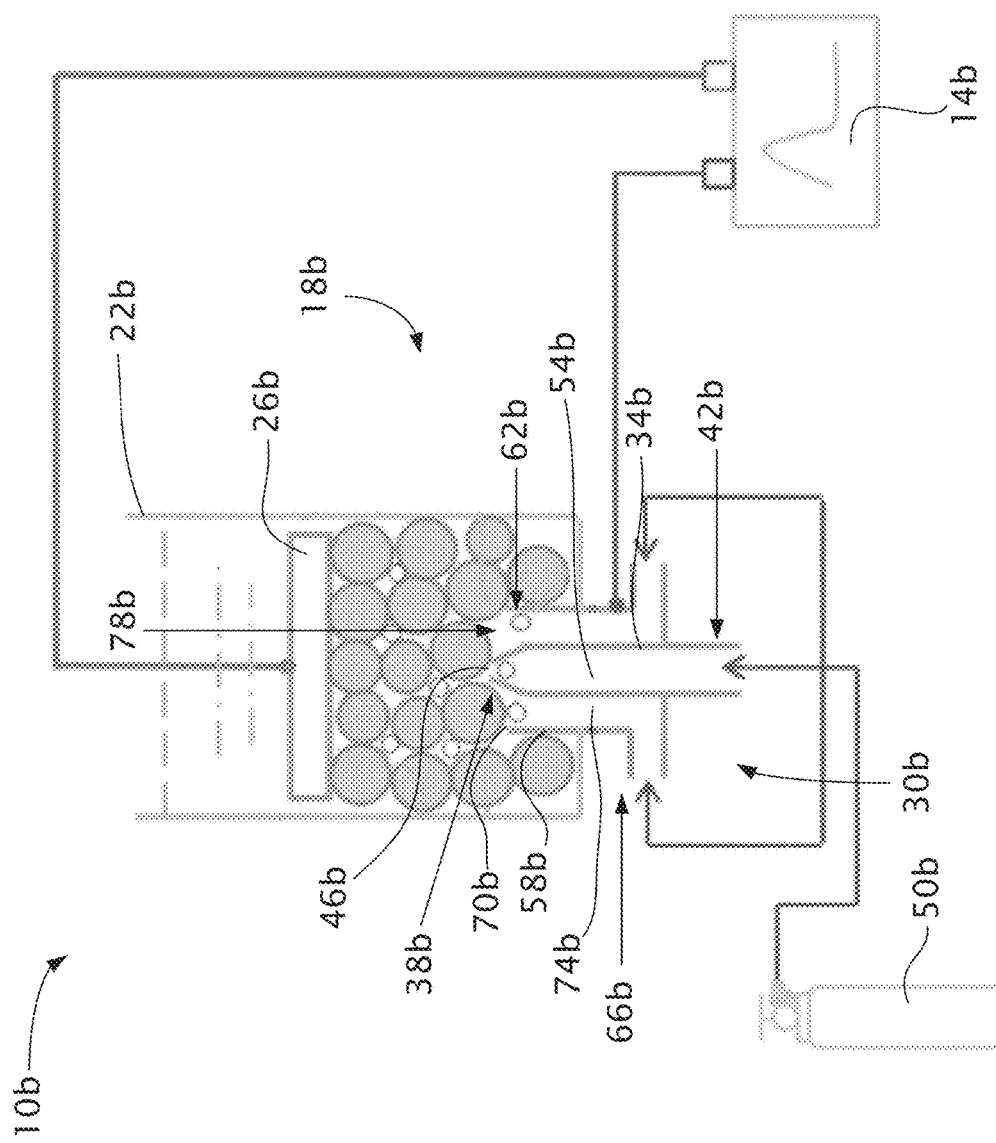
FIG. 2 depicts an embodiment of the present systems that are configured to produce electrical discharges in compositions, where the compositions comprise a liquid having a low dielectric constant and a solid having a high dielectric constant.

The present systems and methods are also configured to produce materials (e.g., material modification and/or material synthesis) due to an electrical discharge in a composition. As previously discussed, gas from gas source $50a$ can comprise, for example, hydrogen, carbon dioxide, helium, argon, nitrogen, oxygen, hydrocarbon gas, and/or any suitable noble gas. Gas from gas source $50a$ may enter container $22a$ through gas pipe $34a$ (e.g., via bore $54a$) and/or through gas pipe $58a$ (e.g., via channel $78a$ and/or bore $74a$) to produce bubbles in reactor $18a$, at least some of which are between electrode $26a$ and gas supply system $30a$. If system $10a$ is activated, power from power supply $14a$ may be supplied to at least a portion of gas supply system $30a$ such that a voltage difference is produced between the at least a portion of gas supply system $30a$ and electrode $26a$. Such a voltage difference produces an electrical field (e.g., in bubbles of gas from gas source $50a$, in liquid having a high dielectric constant, and/or in liquid having a low dielectric constant) and may cause electrical discharge in the composition, which encourages, for example, material modification and/or material synthesis. For example, gas supply system $30a$ can supply oxygen and methane into reactor $18a$ to produce materials such as oxygen atoms, hydrogen radicals, $CH$ radicals, $CH_2$ radicals, $CH_3$ radicals. As another example, gas supply system $30a$ can supply oxygen into reactor $18a$, in which there is a composition of heptane and water, to produce materials such as $H_2$, $CO$, $CH_4$, and ethane as a gas, and heptanol and heptanone as a liquid. Other compositions and/or gas combinations can be used to produce other materials, such as ozone, $H_2O_2$, OFF, and Referring now to FIG. 2, shown therein as numeral $10b$ is another embodiment of the present systems. In the embodiment shown, system $10b$ comprises power supply $14b$ (e.g., a high voltage power supply), which can be configured to provide, for example, from 0 to 200 kilovolts of power to system $10b$. Though depicted as one symbol in FIG. 2, power supply $14b$ may comprise one or more power sources. Further, power supply $14b$ can be one or more of an alternating current (AC) power supply, a direct current (DC) power supply, and/or a pulsed power supply.

In the embodiment shown in FIG. 2, system $10b$ further comprises reactor $18b$. Reactor $18b$ comprises container $22b$, which is electrically insulated, electrode $26b$, which may be configured to be at least partially disposed in container $22b$ and configured to be coupled to power supply $14b$ (and is at least partially disposed in container $22b$ and coupled to power supply $14b$ in the embodiment shown), and gas supply system $30b$, which may be configured to be at least partially disposed in container $22b$ and configured to be coupled to power supply $14b$ (and is at least partially disposed in container $22b$ and coupled to power supply $14b$ in the embodiment shown). Though depicted as one symbol in FIG. 2, electrode $26b$ may comprise one or more electrodes having the same sizes and shapes or different sizes and shapes. For example, in the embodiment shown, electrode $26b$ comprises a plate-like configuration; however, in other embodiments, electrode $26b$ can comprise any suitable configuration, such as a needle-like configuration, a rod-like configuration, and the like. Further, electrode $26b$ may comprise, for example, copper alloys, graphite, any metal having a high melting point (e.g., steel, stainless steel, tungsten, platinum), and/or other suitable materials.

In the embodiment shown in FIG. 2, system $10b$ (and, more specifically, gas supply system $30b$) comprises gas pipe $34b$, which can be at least partially disposed in container $22b$ (and is at least partially disposed in container $22b$ in the embodiment shown). Gas pipe $34b$ includes first end $38b$ and second end $42b$. First end $38b$ of gas pipe $34b$ has opening $46b$ through which fluid (e.g., gas) may exit gas pipe $34b$. Second end $42b$ of gas pipe $34b$ is configured to be coupled to gas source $50b$ (and is coupled to gas source $50b$ in the embodiment shown). Gas source $50b$ may comprise one or more containers of gas. Further, if gas source $50b$ comprises one container of gas, gas source $50b$ can comprise one or more types of gas in the container. Similarly, if gas source $50b$ comprises more than one containers of gas, the more than one containers of gas may have the same or different types of gas, and each of the containers may have one or more types of gas in the container. Gas pipe $34b$ also includes bore $54b$ extending through second end $42b$ and first end $38b$ of gas pipe $34b$. If gas pipe $34b$ is coupled to gas source $50b$ and is at least partially disposed in container $22b$, as depicted in the embodiment shown, gas from gas source $50b$ can be passed through bore $54b$ of gas pipe $34b$ and into container $22b$. Gas from gas source $50b$ may comprise, for example, hydrogen, carbon dioxide, helium, argon, nitrogen, oxygen, hydrocarbon gas, and/or any suitable noble gas or mixtures thereof. In the embodiment shown, first end $38b$ of gas pipe $34b$ is substantially pointed (e.g., at least a portion of the width of gas pipe $34b$ narrows from second end $42b$ to first end $38b$). However, in other embodiments, first end $38b$ of gas pipe $34b$ may comprise any suitable shape such that, if system $10b$ is activated, a nonuniform electrical field is produced between gas supply system $30b$ and electrode $26b$.

In the embodiment shown in FIG. 2, system $10b$ (and, more specifically, gas supply system $30b$) comprises gas pipe $58b$, which may be at least partially disposed in container $22b$ (and is at least partially disposed in container 22*b* in the embodiment shown). Gas pipe 58*b* includes first end 62*b* and second end 66*b*. First end 62*b* of gas pipe 58*b* has opening 70*b* through which fluid (e.g., gas) can exit gas pipe 58*b*. Second end 66*b* of gas pipe 58*b* is configured to be coupled to gas source 50*b* (and is coupled to gas source 50*b* in the embodiment shown). As above, gas source 50*b* may comprise one or more containers of gas. Further, if gas source 50*b* comprises one container of gas, gas source 50*b* may comprise one or more types of gas in the container. Similarly, if gas source 50*b* comprises more than one containers of gas, the more than one containers of gas may have the same or different types of gas, and each of the containers may have one or more types of gas in the container. Gas pipe 58*b* also includes bore 74*b* extending through second end 66*b* and first end 62*b* of gas pipe 58*b*. If gas pipe 58*b* is coupled to gas source 50*b* and is at least partially disposed in container 22*b*, as depicted in the embodiment shown, gas from gas source 50*b* may be passed through bore 74*b* of gas pipe 58*b* and into container 22*b*. Gas pipe 34*b* and gas pipe 58*b* may be coupled to the same or different containers of gas (e.g., such that the same or different types of gas may pass through gas pipe 34*b* and gas pipe 58*b*). As above, gas from gas source 50*b* may comprise, for example, hydrogen, carbon dioxide, helium, argon, nitrogen, oxygen, hydrocarbon gas, and/or any suitable noble gas or mixtures thereof. In some embodiments, such as the embodiment shown, gas pipe 58*b* may be positioned such that gas pipe 34*b* is disposed at least partially within bore 74*b* of gas pipe 58*b* such that channel 78*b* is formed between gas pipe 34*b* and gas pipe 58*b*. In the embodiment shown, gas pipe 34*b* and gas pipe 58*b* share a substantially longitudinal axis (e.g., gas pipe 34*b* is substantially concentric with gas pipe 58*b*). However, in other embodiments, gas pipe 34*b* and gas pipe 58*b* may have different longitudinal axes (e.g., such that channel 78*b* between gas pipe 34*b* and gas pipe 58*b* does not have a uniform width).

In the embodiment shown in FIG. 2, container 22*b* may be configured to accommodate (and is depicted as accommodating) a composition that comprises a liquid (e.g., an organic or inorganic liquid) having a low dielectric constant (e.g., alkane hydrocarbons, aromatic hydrocarbons, and alkene hydrocarbons, and the like) and a solid (e.g., a packed solid) having a high dielectric constant. Mixing a solid having a high dielectric constant with a liquid having a low dielectric constant raises the effective dielectric constant of the composition above the dielectric constant of the liquid having a low dielectric constant. Varying the dielectric constant of the solid having a high dielectric constant and/or the liquid having a low dielectric constant varies the effective dielectric constant of the composition, and such a variance can affect the voltage difference necessary to achieve electrical discharge in the composition. The solid (e.g., packed solid) may comprise any suitable shape, such as substantially cylindrical, substantially rectangular, and substantially spherical. In the embodiment shown, the composition is disposed in container 22*b*, at least some of which is between gas supply system 30*b* and electrode 26*b*. In the embodiment shown, the solid (e.g., packed solid) having a high dielectric constant has a dielectric constant of greater than 10 (e.g., 10.001, 11, 12, 13, 14, 15, or more). For example, some solids having a high dielectric constant include titanium dioxide (approximate dielectric constant of 86 to 173), strontium titanate, (approximate dielectric constant of 310), barium titanate (approximate dielectric constant of 1250 to 10,000), lead zirconium titanate (approximate dielectric constant of 500 to 6,000), calcium copper titanate (approximate dielectric constant of 250,000), and the like. In the embodiment shown, the liquid having a low dielectric constant has a dielectric constant of less than or equal to 10 (e.g., 10, 9, 8, 7, 6, or less). For example, as explained above, some liquids having a low dielectric constant include acetic acid (approximate dielectric constant of 6.2), naphthalene (approximate dielectric constant of 2.5), benzene (approximate dielectric constant of 2.3), butane (approximate dielectric constant of 1.4), caproic acid (approximate dielectric constant of 2.6), castor oil (approximate dielectric constant of 4.7), cotton seed oil (approximate dielectric constant of 3.1), decane (approximate dielectric constant of 2.0), dodecane (approximate dielectric constant of 2.0), gasoline (approximate dielectric constant of 2.0), heptane (approximate dielectric constant of 1.9), hexane (approximate dielectric constant of 2.0), jet fuel (approximate dielectric constant of 1.7), octane (approximate dielectric constant of 2.0), toluene (approximate dielectric constant of 2.4), olive oil (approximate dielectric constant of 3.1), and the like. The liquid having a low dielectric constant and the solid having a high dielectric constant may be mixed, for example, by mechanical agitation, magnetic agitation, one or more acoustic waves (e.g., supersonic waves), and/or any other suitable mixing device.

In the embodiment shown, system 10*b* may be configured such that, if activated, system 10*b* produces a voltage difference in reactor 18*b* and between at least a portion of gas supply system 30*b* and electrode 26*b*. Such a voltage difference in reactor 18*b* may cause electrical discharge in the composition. The present systems and methods permit electrical discharge in a composition to be achieved at lower voltage differences.

The present systems and methods are also configured to produce materials (e.g., material modification and/or material synthesis) due to an electrical discharge in a composition. As previously discussed, gas from gas source 50*b* may comprise, for example, hydrogen, carbon dioxide, helium, argon, nitrogen, oxygen, hydrocarbon gas, and/or any suitable noble gas. Gas from gas source 50*b* can enter container 22*b* through gas pipe 34*b* (e.g., via bore 54*b*) and/or through gas pipe 58*b* (e.g., via channel 78*b* and/or bore 74*b*) to produce bubbles in reactor 18*b*, at least some of which are between electrode 26*b* and gas supply system 30*b*. If system 10*b* is activated, power from power supply 14*b* may be supplied to at least a portion of gas supply system 30*b* such that a voltage difference is produced between the at least a portion of gas supply system 30*b* and electrode 26*b*. Such a voltage difference produces an electrical field (e.g., in bubbles of gas from gas source 50*b*, at contact points between a solid (e.g., a packed solid) having a high dielectric constant, and/or in liquid having a low dielectric constant) and can cause electrical discharge in the composition, which encourages, for example, material modification and/or material synthesis.

The present disclosure further includes methods for producing an electrical discharge through compositions. Such methods may comprise disposing a composition, which comprises a liquid (e.g., an organic or inorganic liquid) having a low dielectric constant and at least one of a liquid (e.g., an organic or inorganic liquid) having a high dielectric constant and a solid (e.g., a packed solid) having a high dielectric constant, in a reactor (e.g., reactor 18*a* and reactor 18*b*), where the reactor comprises a container (e.g., container 22*a* and container 22*b*), an electrode (e.g., electrode 26*a* and electrode 26*b*) disposed in the container, and a gas supply system (e.g., gas supply system 30*a* and gas supply system 30*b*) at least partially disposed in the container; and activating the reactor such that a voltage difference is produced between the gas supply system and the electrode. In some embodiments, the liquid having a low dielectric constant is an organic liquid. In some embodiments, the liquid having a high dielectric constant is an organic liquid. In some embodiments, the solid having a high dielectric constant is a packed solid. The present methods may further comprise mixing the composition by mechanically agitating and/or magnetically agitating the composition and/or mixing the composition, for example, by producing at least one acoustic wave (e.g., at least one supersonic wave) to pass through the composition. In some embodiments, the gas supply system comprises a first gas pipe (e.g., gas pipe 34a and gas pipe 34b) comprising a first end having an opening, a second end configured to be coupled to a gas source and a bore extending through the second end and the first end, where gas from a gas source may be passed through the bore of the first gas pipe and into the container. In some embodiments, the gas system comprises a second gas pipe (e.g., gas pipe 58a and gas pipe 58b) comprising a first end having an opening, a second end configured to be coupled to a gas source, and a bore extending through the second end and the first end, where gas from a gas source may be passed through the bore of the second gas pipe and into the container. In some embodiments, the second gas pipe may be positioned such that the first pipe is disposed at least partially within the bore of the second gas pipe such that a channel is formed between the first gas pipe and the second gas pipe. In some embodiments, the methods further comprise introducing gas from a gas source (e.g., gas source 50a and gas source 50b) into the gas supply system such that the gas may enter the container. In some embodiments, the gas source comprises a noble gas, hydrogen, carbon dioxide, nitrogen, helium, oxygen, hydrocarbon gas, and/or argon or mixtures thereof. Some embodiments of the methods comprise introducing gas from a gas source into the first gas pipe and the second gas pipe such that gas may be introduced into the container in at least three different locations. In some embodiments, the liquid (e.g., an organic or inorganic liquid) having a high dielectric constant has a dielectric constant of greater than 10. In some embodiments, the liquid (e.g., an organic or inorganic liquid) having a low dielectric constant has a dielectric constant of less than or equal to 10. In some embodiments, the solid (e.g., a packed solid) has a dielectric constant of greater than 10. In some embodiments the composition is mixed by mechanical agitation. In some embodiments, the solid (e.g., a packed solid) is at least one of substantially cylindrical, substantially rectangular, and substantially spherical. In some embodiments, the liquid (e.g., an organic or inorganic liquid) having a low dielectric constant comprises at least one of alkane hydrocarbons, aromatic hydrocarbons, and alkene hydrocarbons. In some embodiments, the liquid having a low dielectric constant comprises heptane and the liquid having a high dielectric constant comprises water, and the methods further comprise activating the reactor such that a voltage difference of 10 kilovolts or less is produced between the gas supply system and the electrode to produce an electrical discharge in the composition. In some embodiments, the liquid having a low dielectric constant comprises heptane and the liquid having a high dielectric constant comprises water, and the method further comprising introducing oxygen from the gas supply system into the reactor; and activating the reactor such that at least one of $H_2$, CO, $CH_4$, heptanol, and heptanone is produced.

The above specification and examples provide a complete description of the structure and use of exemplary embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the present systems and methods are not intended to be limited to the particular forms disclosed. Rather, they include all modifications and alternatives falling within the scope of the claims, and embodiments other than the ones shown may include some or all of the features of the depicted embodiments. For example, components may be combined as a unitary structure and/or connections may be substituted. Further, where appropriate, aspects of any of the examples described above may be combined with aspects of any of the other examples described to form further examples having comparable or different properties and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A system for producing a voltage difference comprising:
    a container comprising a liquid having a low dielectric constant and either a liquid having a high dielectric constant or a solid having a high dielectric constant;
    a plate electrode disposed in the liquid in the container and coupled to a power supply; and
    a gas supply system coupled to the power supply, the gas supply system comprising: a first gas pipe and a second gas pipe,
    the first gas pipe comprising: a first end disposed in the liquid of the container and having an opening; a second end coupled to a gas source; and a bore extending through the second end and the first end and enabling gas from the gas source to be passed through the bore of the first gas pipe and into the liquid of the container;
    the second gas pipe comprising: a first end disposed in the liquid of the container and having an opening; a second end coupled to the gas source; and a bore extending through the second end and the first end and enabling gas from the gas source to be passed through the bore of the second gas pipe and into the liquid of the container;
    where the first gas pipe is disposed at least partially within the bore of the second gas pipe such that a channel is formed between the first gas pipe and the second gas pipe; and
    where the electrode and the first ends of the first and second gas pipes are disposed in the liquid such that a voltage difference between at least a portion of the gas supply system and the electrode is produced when the power supply is activated.

2. The system of claim 1, where the container comprises the liquid having a high dielectric constant.

3. The system of claim 2, where the liquid having a low dielectric constant is an organic liquid with a low dielectric constant, and the liquid having a high dielectric constant is selected from the group consisting of an organic liquid with a high dielectric constant and water.

4. The system of claim 1, where the container comprises the solid having a high dielectric constant.

5. The system of claim 4, where the liquid having a low dielectric constant is an organic liquid with a low dielectric constant, and the solid having a high dielectric constant is a packed solid.

6. The system of claim 5, where the packed solid comprises cylindrical, rectangular, or spherical shaped solids.

7. The system of claim 4, where the solid comprises titanium dioxide, strontium titanate, barium titanate, lead zirconium titanate, or calcium copper titanate.

8. The system of claim 4, where the solid comprises a packed solid.

9. The system of claim 8, where the packed solid comprises cylindrical, rectangular, or spherical shaped solids.

10. The system of claim 8, where the packed solid contacts the first end of the second gas pipe.

11. The system of claim 1, where the first end of the first gas pipe comprises a shape enabling production of a non-uniform electrical field between the gas supply system and the electrode when the power supply is activated.

12. The system of claim 11, where a portion of a width of the first gas pipe narrows from the second end to the first end.

13. The system of claim 12, where the first end of the first gas pipe is pointed.

14. The system of claim 1, where the container is electrically insulated.

15. The system of claim 1, where the electrode comprises copper alloy, graphite, steel, stainless steel, tungsten, or platinum.

16. The system of claim 1, where the gas supply system is configured to produce bubbles in the liquid in the container between the electrode and the gas supply system.

17. The system of claim 1, where the power supply is a pulsed power supply.

18. The system of claim 1, where the second end of the second gas pipe is coupled to the gas source at two locations.

19. The system of claim 1, where the gas supply source comprises at least one gas selected from the group consisting of hydrogen, helium, carbon dioxide, helium, a noble gas, argon, oxygen, hydrocarbon gas, nitrogen, and combinations thereof.

* * * * *